(12) United States Patent
Kweder

(10) Patent No.: US 8,263,205 B2
(45) Date of Patent: Sep. 11, 2012

(54) METHOD OF MOLDING COMPLEX COMPOSITE PARTS USING PRE-PLIED MULTI-DIRECTIONAL CONTINUOUS FIBER LAMINATE

(75) Inventor: Matthew Kweder, Dublin, CA (US)

(73) Assignee: Hexcel Corporation, Dublin, CA (US)

( * ) Notice: Subject to any disclaimer, the term of this patent is extended or adjusted under 35 U.S.C. 154(b) by 434 days.

(21) Appl. No.: 12/561,492

(22) Filed: Sep. 17, 2009

(65) Prior Publication Data

US 2011/0064908 A1 Mar. 17, 2011

(51) Int. Cl.
*B29C 71/02* (2006.01)
*B32B 5/12* (2006.01)

(52) U.S. Cl. ............. 428/113; 220/1.5; 220/6; 428/105
(58) Field of Classification Search .......... 428/113, 428/105; 220/1.5, 6
See application file for complete search history.

(56) References Cited

U.S. PATENT DOCUMENTS

| 4,636,535 A | 1/1987 | Wang et al. |
| 6,341,708 B1 * | 1/2002 | Palley et al. ............ 220/1.5 |
| 6,884,379 B1 | 4/2005 | Duqueine |
| 6,924,021 B1 | 8/2005 | Colegrove et al. |
| 2008/0169380 A1 | 7/2008 | Jackson et al. |
| 2009/0101277 A1 | 4/2009 | Cramer et al. |

FOREIGN PATENT DOCUMENTS

| DE | 10 2007 037649 | 2/2009 |
| EP | 0531840 A1 | 3/1993 |
| WO | 89/01123 A1 | 2/1989 |
| WO | 2004/069527 A1 | 8/2004 |
| WO | 2009/130120 A1 | 10/2009 |

OTHER PUBLICATIONS

Prepreg Technology, Publication No. FGU 017b, pp. 1-33, Hexcel Corporation, Mar. 2005.

* cited by examiner

*Primary Examiner* — Brent O'Hern
(74) *Attorney, Agent, or Firm* — W. Mark Bielawski; David J. Oldenkamp

(57) ABSTRACT

Layers of unidirectional (UD) fiber prepreg are formed into a pre-plied, multi-directional, continuous fiber laminate that is used as a molding compound to form three dimensional structures. Cut-outs from the laminate are slotted and folded along fold lines to provide near-net-shaped preforms that may be compression molded to form fiber-reinforced composite structures having complex shapes.

14 Claims, 6 Drawing Sheets

METHOD OF MOLDING COMPLEX COMPOSITE PARTS USING PRE-PLIED MULTI-DIRECTIONAL CONTINUOUS FIBER LAMINATE

BACKGROUND OF THE INVENTION

1. Field of the Invention

The present invention relates generally to fiber-reinforced composite structures and the molding materials that are used to make such structures. More particularly, the present invention involves the use of unidirectional prepreg tape to form pre-plied, multi-directional, continuous fiber laminates that are suitable for molding complex three dimensional fiber-reinforced composite structures via near-net shaped pre-forming.

2. Description of Related Art

Fiber-reinforced composite structures typically include a resin matrix and fibers as the two principal components. These structures are well-suited for use in demanding environments, such as in the field of aerospace, where a combination of high strength and light weight is important.

Pre-impregnated composite material (prepreg) is used widely in the manufacture of composite parts and structures. Prepreg is a combination of uncured resin matrix and fiber reinforcement that is ready for molding and curing into the final composite part. By pre-impregnating the fiber reinforcement with resin, the manufacturer can carefully control the amount and location of resin that is impregnated into the fiber network and ensure that the resin is distributed in the network as desired. Prepreg is a preferred material for use in manufacturing load-bearing structural parts and particularly load-bearing aircraft parts that are used in wings, fuselages, bulkheads and control surfaces. It is important that these parts have sufficient strength, damage tolerance and other requirements that are routinely established for such parts.

Unidirectional (UD) tape is a common form of prepreg. The fibers in unidirectional tape are continuous fibers that extend parallel to each other. The fibers are typically in the form of bundles of numerous individual fibers or filaments that are referred to as a "tows". The unidirectional fibers are impregnated with a carefully controlled amount of uncured resin. The UD prepreg is typically placed between protective layers to form the UD final tape that is rolled up for storage or transport to the manufacturing facility. The width of UD tape typically ranges from less than one inch to a foot or more.

Unidirectional tape is not well-suited for use as a molding compound for forming complex three dimensional structures using compression molding techniques. The parallel orientation and continuous nature of the fibers in the UD tape cause fiber bunching or bridging when the UD tape is forced to fit the features of the complex part. As a result, the manufacture of complex three dimensional parts using UD tape has been limited to a laborious process where individual plies of UD tape are applied directly to a three dimensional mold, which is subsequently processed in an autoclave or other molding apparatus. This lay-up procedure using UD tape tends to be a long and costly process.

Molding compounds that have been found to be suitable for compression molding complex parts commonly employ randomly oriented short fibers that more easily fit the features of the part. However, the use of such short fibers, when assembled into a random mat, introduces local weight variation. The weight variation creates several problems. For example, it contributes to the complexity of the ply design, which has to accommodate for all of the possible total weight outcomes when assembling several highly variable plies for a specific part geometry. The local weight variations in the random mat of short fibers also contribute to irregularities during molding, because areas of low weight are compensated for by areas of high weight. This compensation process differs unpredictably from one molded part to the next and also differs between different features of a given part. As a result, it is difficult for the designer to predict and determine if the molding compound design will be adequate for forming the desired part.

In view of the above, there is a continuing need to provide prepreg molding methods that are suitable for use in compression molding fiber-reinforced composite structures that have a relatively complex shape. The need for such method is especially important in those situations where the strength of the part is a prime consideration.

SUMMARY OF THE INVENTION

In accordance with the present invention, it was discovered that unidirectional (UD) tape can be formed into a pre-plied, multi-directional laminate that can be processed to be suitable for molding. The pre-plied laminate is formed by taking individual layers of UD tape and placing them on top of each other so that the layers or plies of the laminate contain fibers extending in different directions. The pre-plied laminate of the present invention does not have any significant weight variations, which might cause variations during molding that could affect structural performance of the molded three dimensional structures. In addition, it was discovered that the multi-directional nature of the pre-plied laminate allows the part designer to cut slots in the laminate and then fold the laminate into a shape that is close to the final shape of the three dimensional part. The near net-shaping or "pre-forming" of the part to be cured avoids the fiber bunching and bridging that has previously presented problems when UD tape was used directly as a molding compound.

The present invention is directed to methods for forming fiber-reinforced composite structures where a pre-plied, multi-directional laminate is folded into a preform that is then cured to form the composite structure. The pre-plied laminate includes at least a first layer of prepreg and a second layer of prepreg wherein each of the prepreg layers includes an uncured resin matrix and unidirectional fibers. As a feature of the present invention, the directions of the unidirectional fibers in the two prepreg layers are different. The folding of the laminate to form a preform provides one with the ability to control fiber orientation during molding and thereby make very strong three dimensional parts that are particularly well-suited for use in aircraft and other aerospace applications.

The present invention also is directed to the fiber-reinforced composite structures that are made using the laminate. In addition, the preforms that are formed using cut-outs from laminate are covered by the invention. Further, aerospace assemblies, such as aircraft, which include fiber-reinforced composite structures that are made using the pre-plied laminate are covered by the invention.

As a feature of the present invention, the laminate cut-outs may be folded along at least two fold lines that intersect each other to form the three dimensional part. In addition, the laminate is slotted at the intersection of the fold lines in order to enhance the folding process and avoid fiber bridging. The inclusion of slots also allows the designer to form folded preforms where the fibers are oriented, as desired, to meet reinforcement design requirements.

The above described and many other features and attendant advantages of the present invention will become better understood by reference to the following detailed description when taken in conjunction with the accompanying drawings.

DETAILED DESCRIPTION OF THE INVENTION

The present invention involves the formation and use of pre-plied, multi-directional laminates that are used in compression molding processes to form three dimensional parts. The invention is particularly well-suited for making three dimensional parts that have complex shapes and which are designed to carry large loads. Although the present invention finds use mainly in the aerospace industry, the process may also be used in accordance with the present invention to produce three dimensional structures that are suitable for a wide variety of applications where high strength and light weight are desired. The following detailed description is directed mainly to the production of aircraft parts as the preferred types of structures made using the present invention. It will be understood that the invention also has wide application to the production of other types of high strength parts, such as any number of complex three dimensional parts that are used in the automotive, railway, marine, energy, and sports industries.

Figure 1:
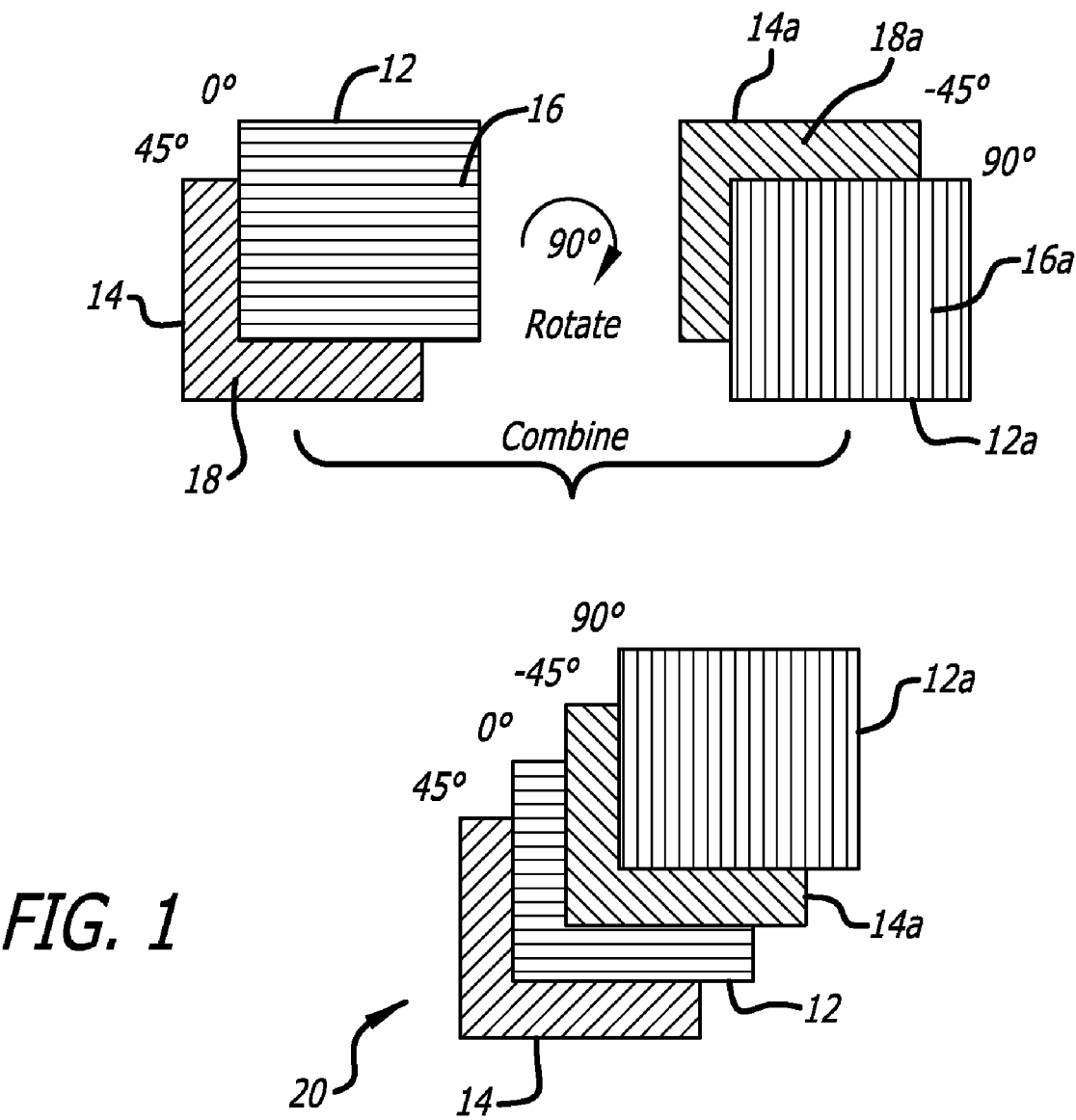
FIG. 1 is a diagrammatic representation showing how the single layers of unidirectional (UD) prepreg or tape are oriented to form a four-ply quasi-isotropic laminate that is suitable for use in making a preferred laminate in accordance with the present invention.
Figure 2:
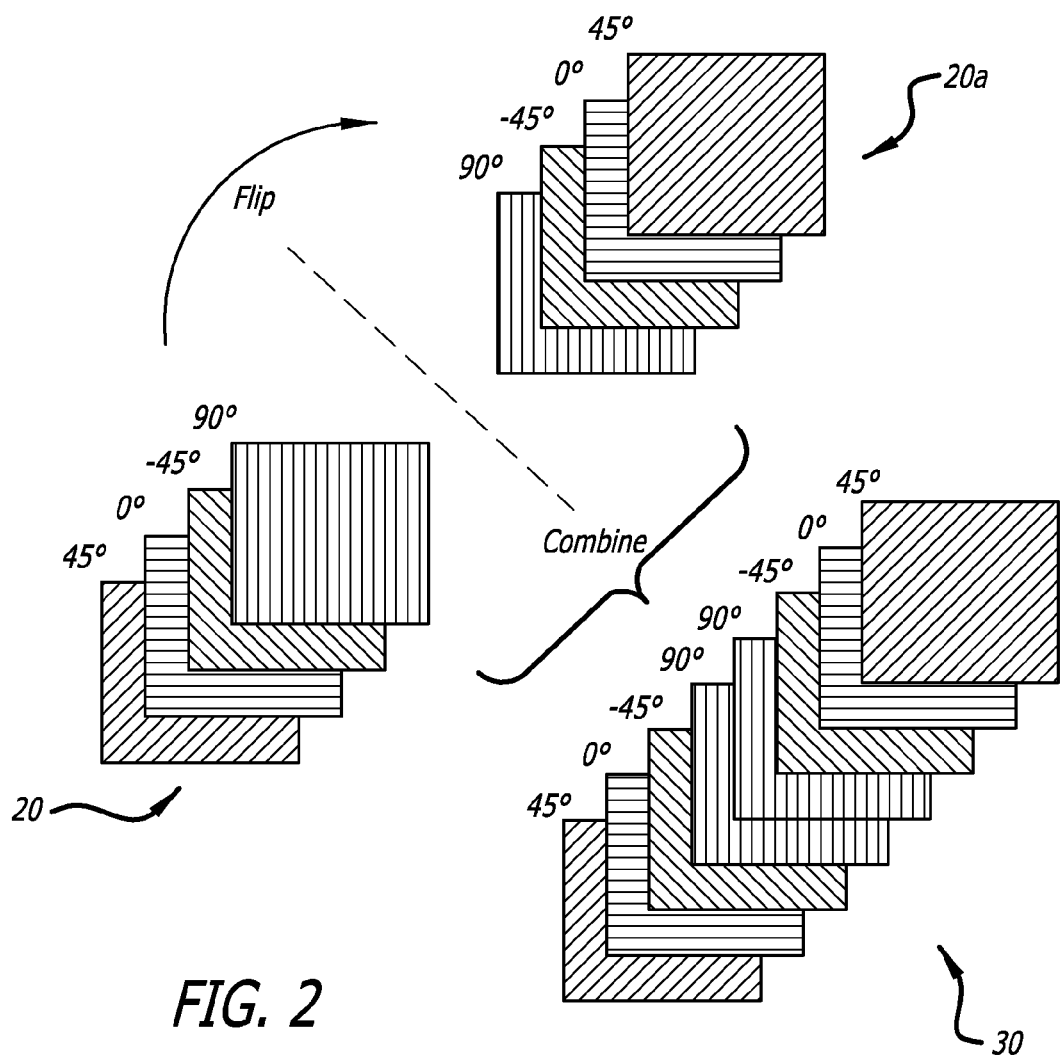
FIG. 2 is a diagrammatic representation showing the fiber orientation that results when two four-ply quasi-isotropic laminates, as shown in FIG. 1, are combined to form a preferred exemplary symmetric eight-ply quasi-isotropic laminate in accordance with the present invention.
Figure 3:
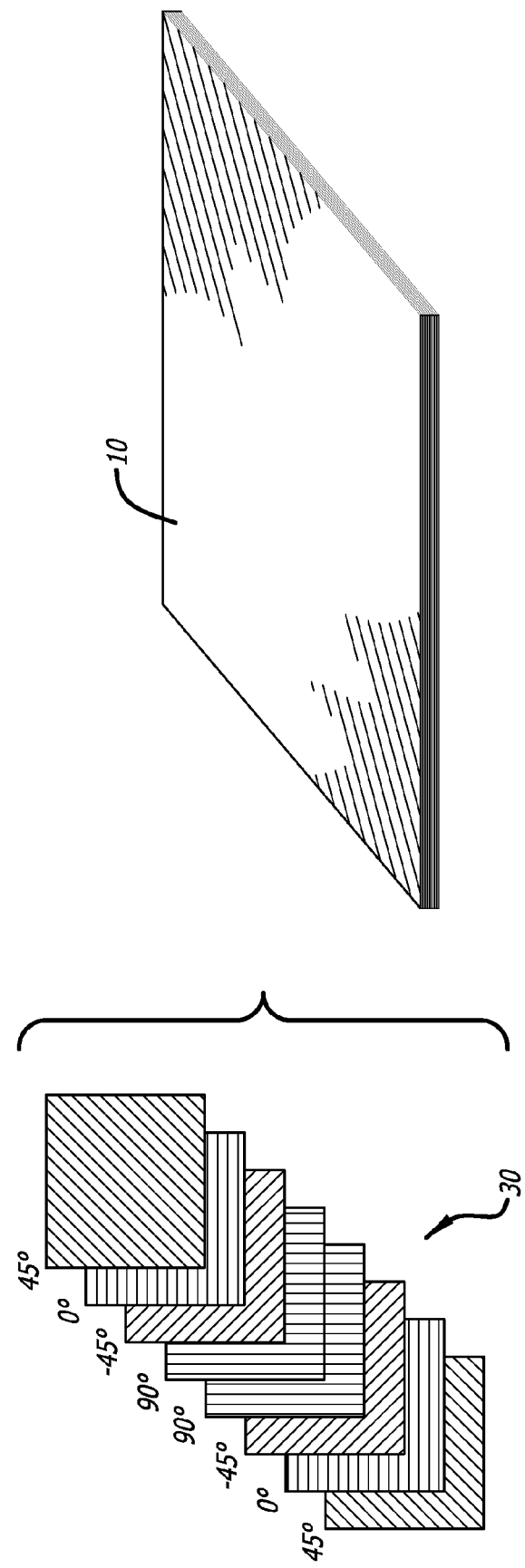
FIG. 3 depicts an exemplary symmetric eight-ply quasi-isotropic laminate in accordance with the present invention.

FIGS. 1-3 depict how an exemplary pre-plied, eight-ply symmetric quasi-isotropic laminate 10 is made in accordance with the present invention. As shown in FIG. 1, a first layer of prepreg 12 and second layer of prepreg 14 are provided. The prepreg layers 12 and 14 each include an uncured resin matrix and unidirectional fibers 16 and 18, respectively. The unidirectional fibers 16 in prepreg 12 are oriented in the 0° direction. The unidirectional fibers 18 in prepreg 14 are oriented in the 45° direction. As further shown in FIG. 1, a second set of two prepreg layers 12a and 14a are provided. The two layers 12a and 14a are the same as layers 12 and 14, except that they have been rotated 90° so that the unidirectional fibers 16a are oriented at 90° and unidirectional fibers 18a are oriented at −45°. The four layers 12, 14, 12a and 14a are combined, as shown in FIG. 1, to form a 4-layer quasi-isotropic laminate 20.

As shown in FIG. 2, a second 4-layer quasi-isotropic laminate 20a is provided that is the same laminate 20, except that it has been flipped over to provide unidirectional fiber orientations that are a mirror image of laminate 20. The two 4-layer mats 20 and 20a are combined as shown at 30 in FIGS. 2 and 3 to form the preferred exemplary pre-plied, eight-ply symmetric quasi-isotropic laminate 10. Laminates have more or less than 8 layers of unidirectional prepreg are possible, provided that they can be slotted and folded to form preforms which do not undergo fiber bunching or bridging when the preform is compression molded/cured. For example, laminates may be prepared where the number of layers of unidirectional prepreg is as high as 16 or more as low as 2

The term "pre-plied" as used herein means that the various layers of UD fiber are combined to form a multiple ply laminate prior to the laminate being cut and/or folded to form a near-net shaped preform. As shown for the preferred laminate 10, adjacent layers of the laminate can have the same direction, as long as at least two of the layers have UD fibers that are oriented in a different direction. It should also be noted that the UD fiber directions of 0°, ±45° and 90° are preferred exemplary fiber orientations. A quasi-isotropic orientation, as shown in FIGS. 1-3 is preferred. However, a wide variety of other UD fiber orientations and layer combinations are possible. The particular combination of UD fiber layers and UD fiber orientations is chosen by the part designer depending upon the desired fiber orientation for the composite structure that is formed after the laminate has been slotted, if necessary, and folded to form the three dimensional shape of the final part.

Unidirectional (UD) tape is the preferred type of prepreg layer that is used to form the pre-plied laminate of the present invention. Unidirectional tape is available from commercial sources or it may be fabricated using know prepreg formation processes. The dimensions of the UD tape may be varied widely depending upon the number and size of the cut-outs that are required to form the desired three dimensional composite structure. For example, the width of the UD tape (the dimension perpendicular to the UD fibers) may range from 0.5 inch to a few feet or more depending on the size and number of desired cut-outs. The tape will typically be from 0.004 to 0.012 inch (0.01 to 0.03 cm) thick and the length of the UD tape (the dimension parallel to the UD fibers) may vary from 0.5 inch (1.3 cm) up to a few feet (one meter) or more depending upon the size and number of desired cut-outs.

The UD tape or prepreg may contain from 25 to 45 weight percent of an uncured resin matrix. Preferably, the amount of uncured resin matrix will be between 30 to 40 weight percent. The resin matrix may be any of the epoxy resins, bismaleimide resins, polyimide resins, polyester resins, vinylester resins, cyanate ester resins, phenolic resins or thermoplastic resins. Exemplary thermoplastic resins include polyphenylene sulfide (PPS), polysulfone (PS), polyetheretherketone (PEEK), polyetherketoneketone (PEKK), polyethersulfone (PES), polyetherimide (PEI), polyamide-imide (PAI). Epoxy resins that are toughened with a thermoplastic are preferred resin matrices. Resins that are typically present in UD tape of the type used in the aerospace industry are preferred. The UD fibers may be carbon, glass, aramid or any other fiber material that is typically used in the fabrication of composite parts that are used in high stress environments. The fibers may contain from a few hundred filaments to 12,000 or more filaments. Preferred UD fibers are carbon fibers.

A preferred exemplary commercially available unidirectional prepreg is HexPly® 8552, which is available from Hexcel Corporation (Dublin, Calif.). HexPly®8552 is available in a variety unidirectional tape configurations that contain an amine cured toughened epoxy resin matrix in amounts ranging from 34 to 38 weight percent and carbon or glass UD fibers having from 3,000 to 12,000 filaments. The fibers typically account for 60 volume percent of the UD tape.

Figure 4:
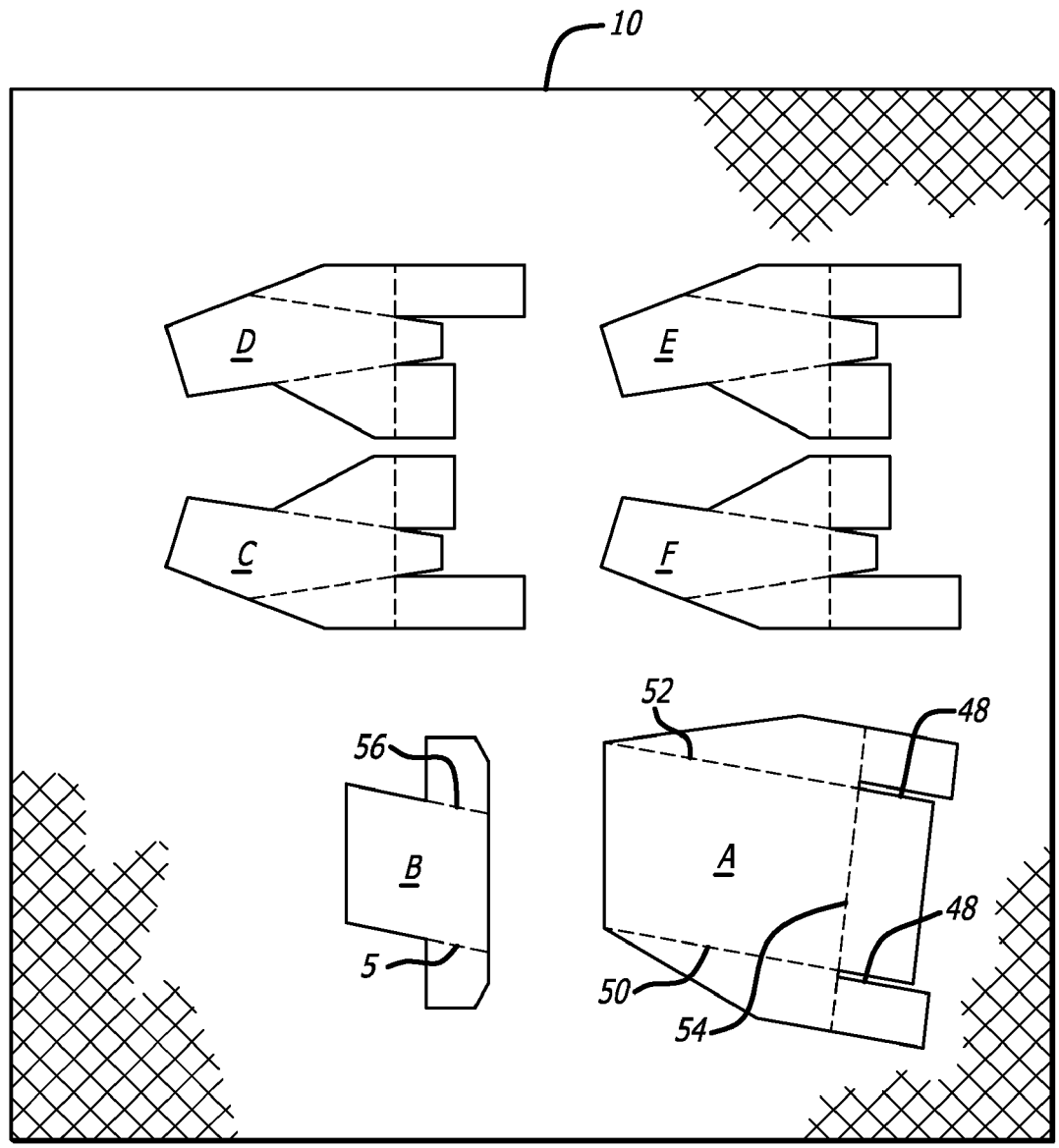
FIG. 4 shows cut-outs in the laminate that are made in order to form an exemplary flange support structure.
Figure 5:
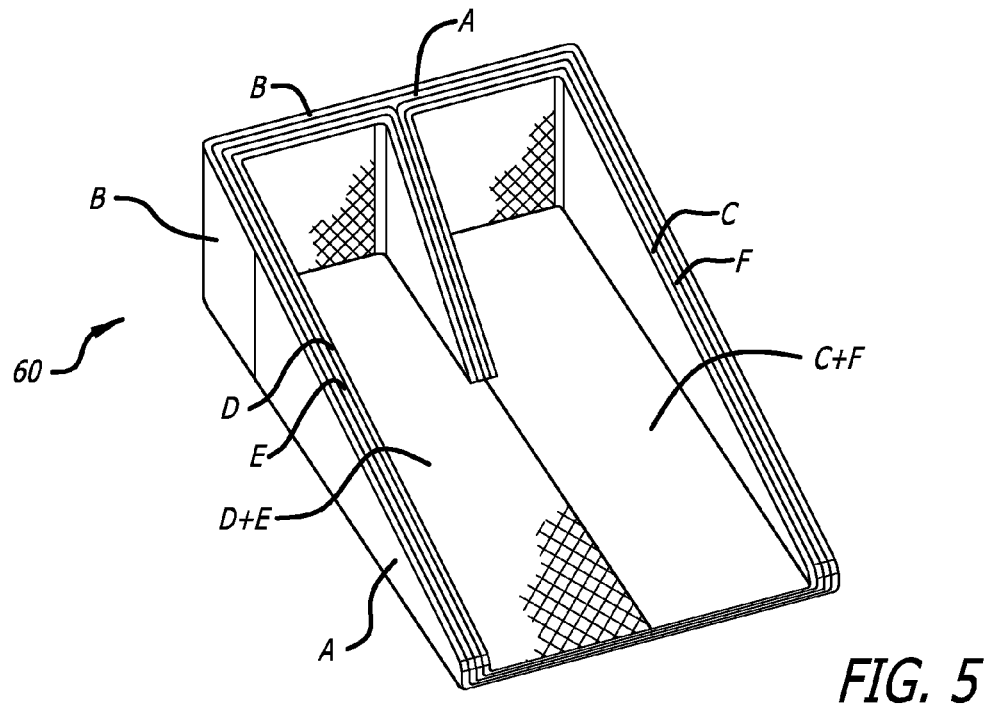
FIG. 5 is a preform of an exemplary flange support structure that has been formed by folding and combining the cut-outs shown in FIG. 4
Figure 6:
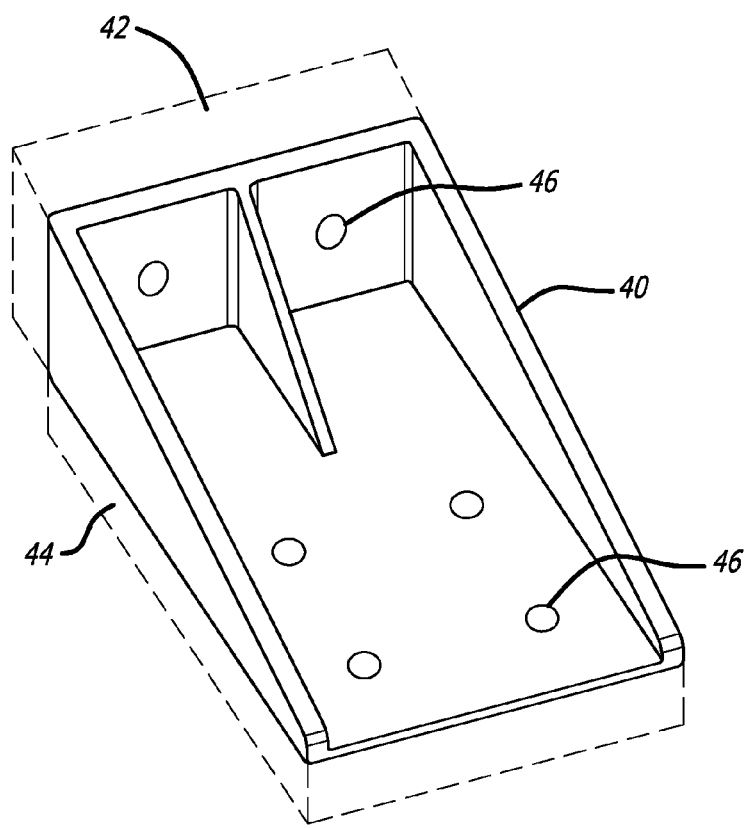
FIG. 6 is an exemplary flange support structure that is formed when the preform of FIG. 5 is cured.

The formation of an aircraft flange support structure 40 in accordance with the present invention is shown in FIGS. 4-6. The flange support structure 40 is designed to connect two aircraft parts together. The two aircraft parts 42 and 44 are shown in phantom in FIG. 6. The aircraft parts 42 and 44 are load-bearing primary structure elements of the aircraft. The term "load-bearing" means that the part is designed to have sufficient strength and stiffness to support a given stress or load without failing. Typical loads that are carried by such parts are on the order of 1000 pounds or more. Loads on the order of 6000 pounds or higher are not uncommon in parts made with this material and process. The flange support structure 40 must be able to bear the same or greater loads than the primary aircraft parts 42 and 44 in order to prevent failure of the flange 40 that connects the two load-bearing parts together. The aircraft parts 42 and 44 may be attached to the flange support 40 by way of bolting through holes 46 or by adhesive bonding.

The flange support structure 40 is made using six cut-outs (A-F) as shown in FIG. 4. The cut-outs are cut from the preferred symmetric quasi-isotropic laminate 10. Linear slots are formed in the "A" cut-out as shown at 48. A first tab portion is located on the outside of each slot 48 and a second tab portion is located between slots 48. The A cut-out is folded along fold lines 50, 52 and 54, as shown in phantom, such that the first and second tab portions overlap each other and are pushed together to form a portion of the preform as shown in FIG. 5. The slots 48 are located at the intersection of fold lines 50 and 54 and at the intersection of fold lines 52 and 54. The slots 48 extend from the interior of the A cut-out at the fold line intersection to the edge of the cut-out. The slots 48 are collinear with fold lines 50 and 52.

Cut-out B is folded at phantom lines 56 and 58. Since the two fold lines do not intersect, no slots are required. Cut-outs C and D are mirror images of each other with the fold lines being shown in phantom. Slots are located at the intersections of the fold lines in the C and D cut-outs in the same manner as cut-out A. Cut-outs E and F are mirror images of each other with the fold lines also being shown in phantom. Slots are located at the intersections of the fold lines in the E and F in the same manner as cut-out A. The slots function as relief cuts that allow the various cut-out sections to be folded into position without deforming the orientation of the fibers and to provide bridging of the cut-outs or flow of resin matrix where desired.

The cut-outs A-F are folded and combined to form a preform 60 as shown in FIG. 5. The fold lines may be heat slightly, if desired, to reduce the viscosity of the resin matrix and make it easier to fold the cut-outs. However, heating should be kept to a minimum to prevent inadvertent premature curing of the cut-out. In general, the fold line should be heated just enough to decrease the viscosity of the resin matrix without initiating curing of the overall cut-out. The temperature will vary depending upon the type of resin matrix used. The fold lines should only be heated for a sufficient time to allow the laminate to be bent into the desired shape. The fold lines should be heated for as short a time as possible and preferably on the order of no more that a few minutes to avoid localized curing of the cut-out.

An advantage of the present invention is that the preform 60 can be shaped close to the shape of the final part. The preform is preferably "near-net-shaped". Near-net-shaped means that the dimensions of the preform are within at least 3 mm of the molded dimensions of the cured fiber-reinforced composite structure. Preforms that are undersized more than 3 mm of the molded dimensions of the cured fiber-reinforced composite structure are possible. For example, a preform may be designed to be undersized by 25 mm or more of the molded dimensions of the cured part depending on the size, geometry, and expected structural performance of the final cured part. The preform 60 may be partially cured in order to increase the viscosity of the resin matrix to ensure that the preform retains the desired near-net-shape. The resin matrix may be partially cured (advanced) by any of the known partial curing processes provided that the viscosity of the resin is adjusted so that the shape of the preform 60 is retained. A process commonly known as "B-staging" is a preferred process for advancing the resin matrix prior to compression molding or other curing process.

Curing of the preform 60 may be accomplished by any of the usual curing or molding protocols commonly used in the aerospace industry. Compression molding is a preferred process for converting the preform 60 into the final aircraft flange support 40. This process involves applying pressure to the preform 60 by way of a closed mold in a press. Curing pressures, temperatures and times will vary depending upon a number of variables including the type of resin matrix and the size of the preform. These curing variables are known by those of ordinary skill in the art for the various types of resin systems including epoxy resins, bismaleimide resins, polyimide resins, polyester resins, vinylester resins, cyanate ester resins, and phenolic resins. The near-net-shaped preforms are formed and B-staged, if necessary, to control resin and fiber flow and to form a net-shaped three dimensional part.

Figure 7:
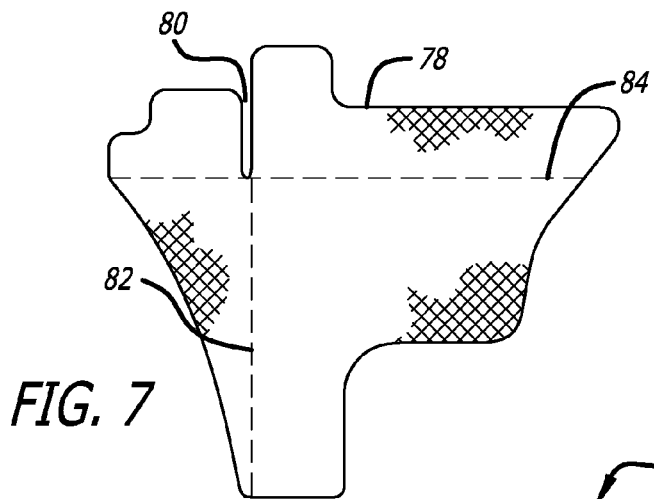
FIG. 7 is an exemplary cut-out of the laminate that is used to make an aircraft clip structure that is used to join two primary structure aircraft parts together.
Figure 8:
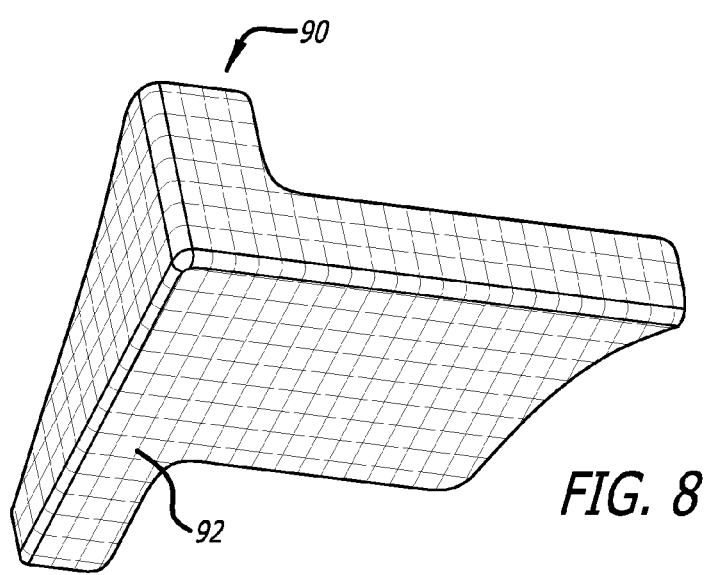
FIG. 8 is a preform of an exemplary aircraft clip structure that is formed by folding the cut-out shown in FIG. 7.
Figure 9:
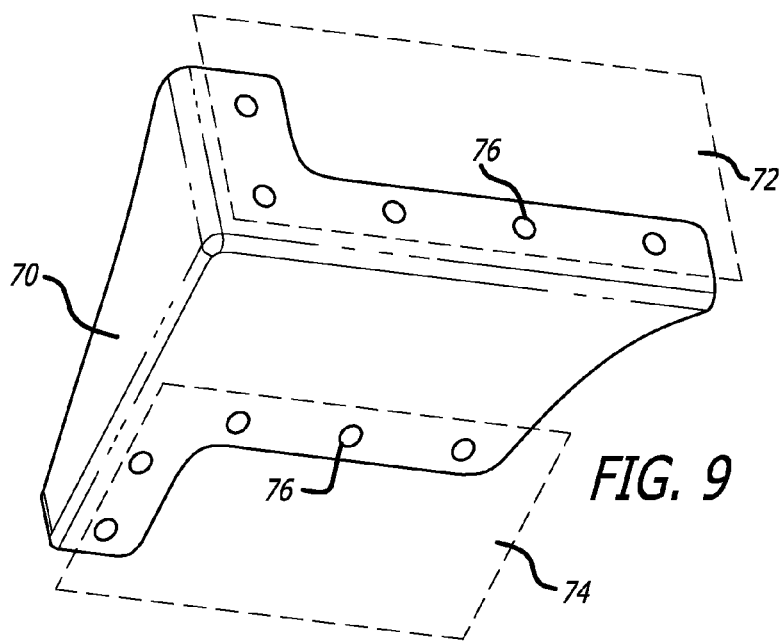
FIG. 9 is an exemplary aircraft clip structure that is formed when the preform of FIG. 8 is cured.

The formation of an aircraft clip structure 70 in accordance with the present invention is shown in FIGS. 7-9. The clip structure 70 is designed to connect two primary structure aircraft parts together. The two primary structure aircraft parts 72 and 74 are shown in phantom in FIG. 9.

The clip structure 70 is made using one or more cut-outs as shown at 78 in FIG. 7. The cut-outs are cut from the preferred symmetric quasi-isotropic laminate 10. A linear slot is formed in the cut-out as shown at 80. The cut-out 78 is folded along fold lines 82 and 84, as shown in phantom. The slot 80 is located at the intersection of fold lines 82 and 84. The slot 80 extends from the interior of the cut-out at the fold line intersection to the edge of the cut-out. The slot 80 is collinear with fold line 82.

The cut-out 78 is folded to form a clip preform 90 as shown in FIG. 8. The clip preform 90 is near-net-shaped so that it is close to the shape of the final clip 70. The orientation of the fibers in the preform 90 are shown in simplified form as lines 92 to demonstrate the orientation of the fibers changes as the cut-out 78 is folded to form the preform 90. The re-direction of the UD fibers that occurs during the folding step must be taken into consideration by the designer in order to provide the desired fiber orientation in the preform 90 and final clip 70.

In the same manner as the flange support preform 60, the clip preform 90 may be partially cured in order to increase the viscosity of the resin matrix to ensure that the preform properly forms into the final cured dimensions of the desired part shape. "B-staging" is the preferred process for advancing the resin matrix of the clip preform 90 prior to compression molding or other curing process.

The clip preform 90 may be cured using any of the usual curing or molding protocols in the same manner as described above for the curing of the flange support preform 60. Compression molding is a preferred process for converting the preform 90 into the final aircraft clip 70.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A fiber-reinforced composite structure that is made according to a method comprising the steps of:
providing a pre-plied, multi-directional laminate comprising an interior and an edge, said laminate comprising at least a first layer of prepreg and a second layer of prepreg wherein each of said prepreg layers comprises an uncured resin matrix and unidirectional fibers and wherein the direction of said unidirectional fibers in said first prepreg layer is different from the direction of said unidirectional fibers in said second prepreg layer and wherein said laminate comprises a first tab portion and a second tab portion;
folding said laminate to form a preform wherein said first tab portion and said second tab portion overlap each other and are pushed together to form a portion of the preform; and
curing said preform to form said composite structure wherein the portion of said preform that is formed by said first and second tab portions is cured to form a cured portion of said composite structure.

2. A fiber-reinforced composite structure according to claim 1 wherein said laminate comprises at least two fold lines along which said laminate is folded during formation of said preform and wherein said fold lines intersect each other.

3. A fiber-reinforced composite structure according to claim 1 wherein said laminate comprises at least one linear slot that extends from the interior of said laminate to the edge of said laminate, said linear slot defining an edge of said first tab portion and said second tab portion.

4. A fiber-reinforced composite structure according to claim 2 wherein said laminate comprises at least one linear slot that extends from the interior of said laminate to the edge of said laminate, said linear slot defining an edge of at least one of said first tab portion and said second tab portion and wherein said linear slot is collinear with at least one of said fold lines.

5. A fiber-reinforced composite structure according to claim 4 wherein said linear slot extends from the intersection of said fold lines to the edge of said laminate.

6. A fiber-reinforced composite structure according to claim 1 wherein said composite laminate comprises at least one fold line and wherein said fold line is heated prior to folding said laminate to form said preform.

7. A fiber-reinforced composite structure according to claim 1 wherein multiple preforms are combined together to form a multi-laminate preform that is cured to form said fiber-reinforced composite structure.

8. A preform for use in forming a fiber-reinforced composite structure, said preform being made according to a method comprising the steps of:
providing a pre-plied, multi-directional laminate comprising an interior and an edge, said laminate comprising at least a first layer of prepreg and a second layer of prepreg wherein each of said prepreg layers comprises an uncured resin matrix and unidirectional fibers and wherein the direction of said unidirectional fibers in said first prepreg layer is different from the direction of said unidirectional fibers in said second prepreg layer and wherein said laminate comprises a first tab portion and a second tab portion; and
folding said laminate to form said preform wherein said first and second tab portions overlap each other and are pushed together to form a portion of the preform.

9. A preform according to claim 8 wherein said laminate comprises at least two fold lines along which said laminate is folded during formation of said preform and wherein said fold lines intersect each other.

10. A preform according to claim 8 wherein said laminate comprises at least one linear slot that extends from the interior of said laminate to the edge of said laminate, said linear slot defining an edge of said first tab portion and said second tab portion.

11. A preform according to claim 9 wherein said laminate comprises at least one linear slot that extends from the interior of said laminate to the edge of said laminate, said linear slot defining an edge of said first tab portion and said second tab portion and wherein said linear slot is collinear with at least one of said fold lines.

12. A preform according to claim 11 wherein said linear slot extends from the intersection of said fold lines to the edge of said laminate.

13. A preform according to claim 8 wherein said composite laminate comprises at least one fold line and wherein said fold line is heated prior to folding of said laminate to form said preform.

14. A preform according to claim 8 wherein multiple preforms are combined together to form a multi-laminate preform.

* * * * *